United States Patent [19]

Rawlings et al.

[11] Patent Number: 5,637,933
[45] Date of Patent: Jun. 10, 1997

[54] ELECTRICAL SYSTEMS AND CONNECTORS

[75] Inventors: Keith C. Rawlings; Paul Thomas, both of Cheltenham, England

[73] Assignee: Smiths Industries plc, London, England

[21] Appl. No.: 390,314

[22] Filed: Feb. 17, 1995

[30] Foreign Application Priority Data

Apr. 5, 1994 [GB] United Kingdom ............... 9406625

[51] Int. Cl.$^6$ ............................................. H02J 5/00
[52] U.S. Cl. ........................ 307/147; 307/38; 340/825.52
[58] Field of Search ............................. 307/38, 39, 147, 307/31, 40, 112, 113, 116, 125, 126, 139, 140; 340/825.52

[56] References Cited

U.S. PATENT DOCUMENTS

| | | | |
|---|---|---|---|
| 5,191,520 | 3/1993 | Eckersley | 363/72 |
| 5,289,043 | 2/1994 | Marshall et al. | 307/38 |
| 5,317,697 | 5/1994 | Husak et al. | 395/325 |
| 5,436,510 | 7/1995 | Gilbert | 307/38 |

FOREIGN PATENT DOCUMENTS

| | | |
|---|---|---|
| 2083301 | 3/1982 | United Kingdom . |
| 92/02981 | 2/1992 | WIPO . |

Primary Examiner—William M. Shoop, Jr.
Assistant Examiner—Jonathan S. Kaplan
Attorney, Agent, or Firm—Pollock, Vande Sande & Priddy

[57] ABSTRACT

An electrical system for controlling the supply of power to several items of electrical equipment via a power bus, an interface bus and respective connector assemblies. Each connector assembly has a connector containing a power switch connected to a monitor and an interface unit, which controls operation of the switch. The interface unit also receives configuration data about the power requirements of the respective item of equipment from a configurations code device in a mating connector on the equipment. The interface unit supplies signals to a control unit via the interface bus and receives signals from the control unit to control switching of the power switch.

7 Claims, 1 Drawing Sheet

ELECTRICAL SYSTEMS AND CONNECTORS

BACKGROUND OF THE INVENTION

This invention relates to electrical systems and connectors.

In systems comprising a power supply and electrical equipment connected with the supply, it is often necessary to monitor operation of the equipment, such as its power dissipation, in order to detect a malfunction. In conventional systems, the power supply may include a distribution panel in which the monitors are contained, and power cables extending between the panel and the equipment. It will be appreciated, in such systems, that separate cables are needed for connecting the equipment to the panel if the equipment is to be monitored individually. Also, if individual equipment is to be isolated, such as on detection of a failure or for load shedding purposes, this requires each item of equipment to be connected to the distribution panel via an individual cable. Such systems require a large amount of wiring, leading to complex installation and a heavy weight. By contrast, in power bus systems, where equipment tap off a common power bus, there is a much greater simplicity of installation and a reduction in the weight and volume. However, in power bus systems, the monitoring, control and isolation of individual equipment has not previously been readily possible.

BRIEF SUMMARY OF THE INVENTION

It is an object of the present invention to provide an improved electrical system.

According to the present invention there is provided an electrical system including a power supply system, a plurality of items of electrical equipment and a plurality of connector assemblies, the power supply system including a control unit and a power bus, the connector assemblies connecting each respective item of equipment to the power bus, and each connector assembly including a power switch for controlling supply of power to the associated equipment, a monitor arranged to monitor operation of the associated equipment and signalling means for interconnecting the control unit with both the power switch and the monitor so that the power switch can be controlled by the control unit in response to the monitor.

The monitor may be arranged to monitor the power drawn by the associated equipment. The signalling means preferably includes an electrically-conductive interface bus connected to the control unit. The system may include means for reading configuration data of the associated equipment, the signalling means being arranged to supply the configuration data to the control unit. The configuration data may be indicative of the power requirements of the associated equipment. The configuration data may be provided by a configurations code device formed by a hard-wired connection or by a resistor. The monitor may be arranged to monitor the temperature in the region of the power switch. The connector assembly preferably comprises a cable having a connector at each end, the power switch, the monitor and a part of the signalling means being mounted within one of the connectors.

An electrical system, in accordance with the present invention, will now be described, by way of example, with reference to the accompanying drawings.

DETAILED DESCRIPTION OF THE PREFERRED EMBODIMENT

Figure 1:
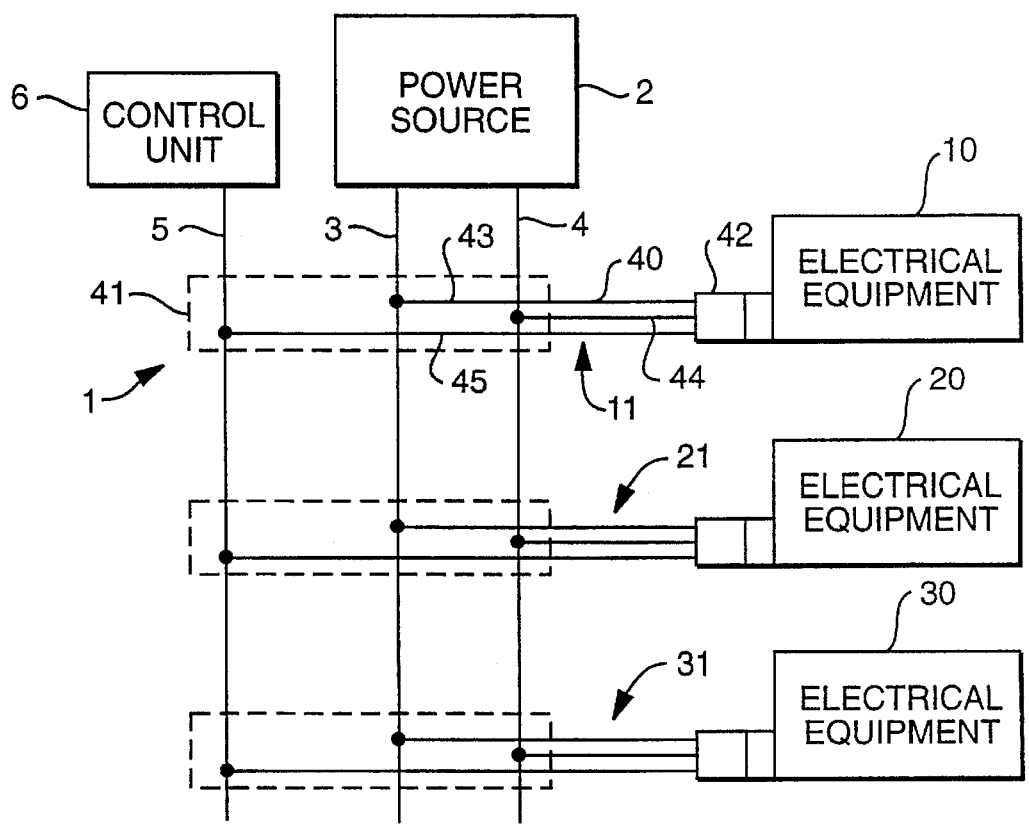
FIG. 1 illustrates the system schematically.
Figure 2:
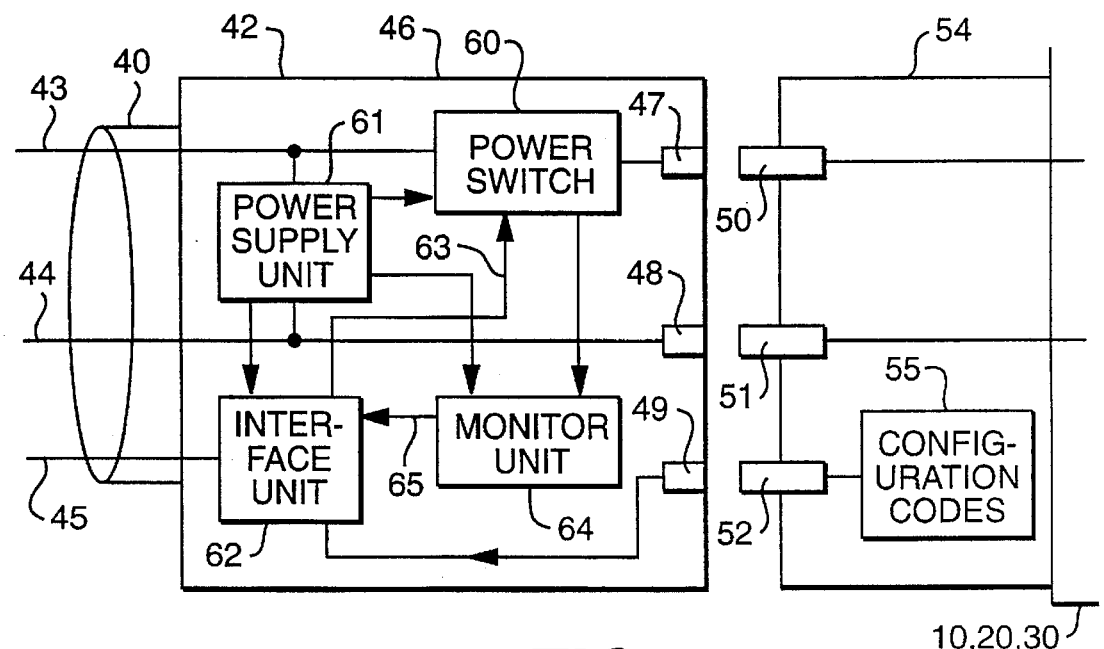
FIG. 2 shows a part of the system in greater detail.

The electrical system may be installed in a vehicle, such as a car, aircraft, fighting vehicle or ship, or it may be installed in a factory or a house. The electrical system comprises a power supply system 1 having a power source 2, a power supply line 3 and a return line 4 connected to the source. The electrically-conductive lines 3 and 4 run along the system to form a power bus and, ruing alongside this is a conductive power control interface bus 5. The interface bus 5 is connected to a common control unit 6.

Connected to the power bus 3, 4 and interface bus 5 are several items of electrical equipment, only three of which are shown here labelled 10, 20 and 30. In an aircraft, for example, equipment 10 might be the aircraft galley equipment, equipment 20 might be cabin lighting and equipment 30 might be the flight control computer. The equipment 10, 20 and 30 are connected to the power and interface buses by respective connector assemblies 11, 21 and 31. The connector assemblies 11, 21 and 31 each comprise a cable 40 and a connector 41 and 42 at opposite ends of the cable. The cable 40 has three wires 43 to 45 connected respectively to the power line 3, the power return line 4 and the power control interface bus 5, via the connector 41, which may be of conventional construction. The connector 42, at the equipment end of the assemblies 11, 21 and 31, is of a novel construction. In the present embodiment, it is shown as being a female connector with an outer metal shell or housing 46 having three sockets 47, 48 and 49 at one end. The sockets 47 to 49 are arranged to receive corresponding pins 50 to 52 in a male connector 54 on the equipment 10, 20 and 30. The housing 46 of the female connector 42 is provided with conventional locking means (not shown), such as a locking ring, for retaining it on the male connector 54.

Within the housing 46 of the connector 42, the socket 48 is connected directly to the wire 44 extending to the power return bus 4. The socket 47 is connected to the power supply line 43 via a power switch 60 within the housing 46. The power switch 60 may be an electromagnetic relay or a semiconductor switching device or circuit that can be externally controlled to prevent or enable supply of power to the socket 47. The housing 46 contains a power supply unit 61 connected across the power supply line 43 and the return line 44 on the side of the power switch 60 remote from the equipment. The power supply unit 61 derives power for the devices within the connector. The housing 46 of the connector 42 also contains a control and interface unit 62 connected to the power switch 60 by a line 63. A monitor unit 64 within the housing 46 is connected to receive an output from the power switch 60. The output is indicative both of the state of the power switch 60, ON or OFF, and of the power drawn by the associated equipment, such as derived from a current sensor in the power switch. The output to the monitor 64 may also include a signal representative of the temperature in the region of the power switch 60 so that the monitor is responsive to any overheating of the switch. The output of the monitor unit 64 is connected via a line 65 to the interface unit 62. The interface unit 62 is also connected to the third socket 49 of the connector.

Although the third socket 49 is shown as a single socket, in practice it might formed by several sockets or by several contacts in a single socket. The third socket 49 mates with the pin 52 in the equipment connector 54, which is connected to a configuration codes device 55. The configuration codes device 55 may take many different forms such as, for example, an electronic store, a hard-wired connection of different pins, or an electronic device such as a resistor of a selected value. The purpose of the configuration codes device 55 is to provide information about the nature of the equipment, such as, for example, its load and power requirements and its load shedding priority. The configuration data is read by the interface unit 62. In the present example, the device 55 in equipment 10 indicates that it has a power requirement of 2000VA, that it is galley equipment and that, if load needs to be shed, it has a low priority. The device 55 in equipment 20 indicates that it has a power requirement of 300VA, that it is cabin lighting and that it has an intermediate priority. The device 55 in equipment 30 indicates that it has a power requirement of 100VA, that it is the flight control computer and that it has a high priority. The configuration code device 55 may be included in the equipment connector 54 or at any other part of the equipment 10, 20 and 30.

In normal operation, the connector assemblies 11, 21 and 31 connect the equipment 10, 20 and 30 to the power supply source 2 and to the control unit 6. The control unit 6 provides a continual monitoring for any malfunctioning of the equipment 10, 20 and 30 or the power switch 60 associated with the equipment. If any malfunction should occur, such as an excessive load being drawn by the equipment, a faulty opening of the power switch, or an overheating of the power switch, this will be signalled by the monitor unit 64 and the interface unit 62 via the power control interface bus 5 to the control unit 6. The power control unit 6 may respond, for example, to an excessive load being drawn by equipment 20 by supplying a signal on the interface bus 5 instructing opening of the power switch 60 in the connector 42 connected to the faulty equipment. This signal will be received by the interface unit 62 in all three connectors but only the unit with the correct configuration code will act on the instruction.

Similarly, there may be a fault in the power source 2 resulting in a reduction of the available power to a level insufficient to power all three items of equipment. In these circumstances, the control unit 6 identifies the equipment with lowest priority, namely equipment 10, and instructs the power switch 60 associated with that equipment to be opened so that power supply to the equipment is prevented and the overall power drawn by the electrical system is reduced.

The monitor unit 64 could also be arranged to open the power switch 60 directly, on detecting of a malfunction, without the intervention of the control unit 6. The monitor unit 64 and power switch 60 need not be separate units, as shown, but could be within a common unit.

Instead of locating the power switch 60, monitor 64, interface unit 62 and power supply unit 61 within the connector 42, which mates with the equipment, they could be in the connector 41 at the other end of the assembly 11, 21, 31.

The interface bus 5 provides signalling means between the control unit 6 and the power switch 60 and the monitor 64. This need not be a separate wire, as described above, but it could be provided on one of the power supply lines 3 or 4 by signals at a frequency different from the power supply frequency. In such an arrangement, the power control interface signals would be supplied to the control unit 6 and the interface unit 62 by appropriate filtering of signals on the power supply lines. Instead of using an electrical wire to provide the power control interface signals, these could be supplied via a fibre-optic cable. Alternatively, wireless techniques could be used, such as, an infra-red link or radio transmission.

The present invention enables considerable flexibility in the electrical system because the equipment can be connected to the bus at any point. Because the equipment do not have to be connected to the power supply source by dedicated cables, it considerably facilitates installation and reduces the amount of cabling required, thereby reducing the space requirement for the cabling and the weight.

What we claim is:

1. An electrical system comprising: a power supply system, a plurality of items of electrical equipment and a plurality of connector assemblies, wherein each item of electrical equipment has configuration data encoded therein, wherein the power supply system includes a control unit and a power bus, wherein the connector assemblies connect each respective item of equipment to the power bus, and wherein each connector assembly includes a power switch for controlling supply of power to the respective equipment, means for reading the said configuration data of the respective equipment and signalling means interconnecting the control unit with both the power switch and the configuration data reading means so that control unit can identify the configuration of each item of equipment and control its power switch accordingly.

2. An electrical system according to claim 1, wherein the signalling means includes an electrically-conductive interface bus, which connects to the control unit.

3. An electrical system according to claim 1, wherein the configuration data is indicative of the power requirement of the respective equipment.

4. An electrical system according to claim 1, wherein the configuration data is provided by a configurations code device formed by a hard-wired connection.

5. An electrical system according to claim 1, wherein each connector assembly includes a monitor arranged to monitor operation of the respective equipment, and wherein said signalling means is interconnected with said monitor so that the power switch can be controlled by the control unit in response to the monitor.

6. An electrical system according to claim 5, wherein the monitor monitors the power drawn by the respective equipment.

7. An electrical system according to claim 5, wherein the monitor monitors the temperature in the region of the power switch.

* * * * *